Patented Mar. 17, 1953

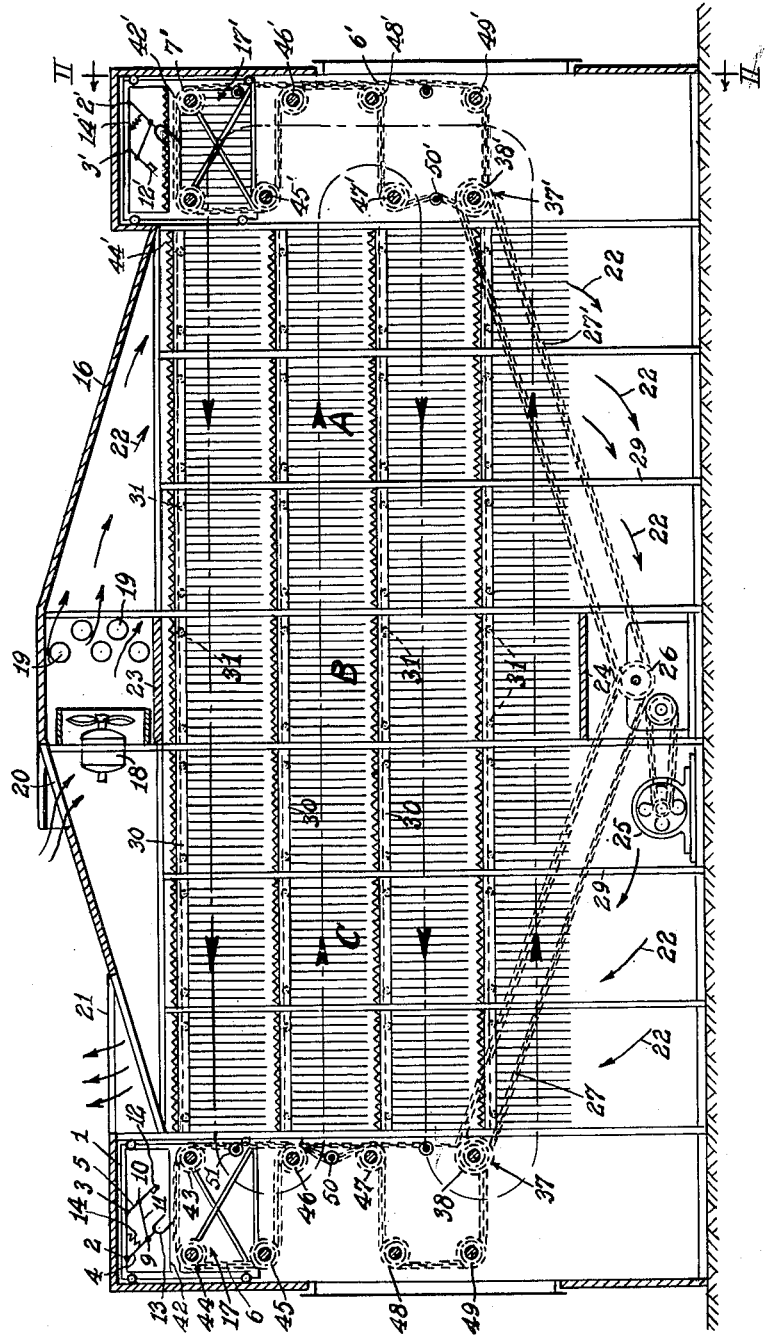

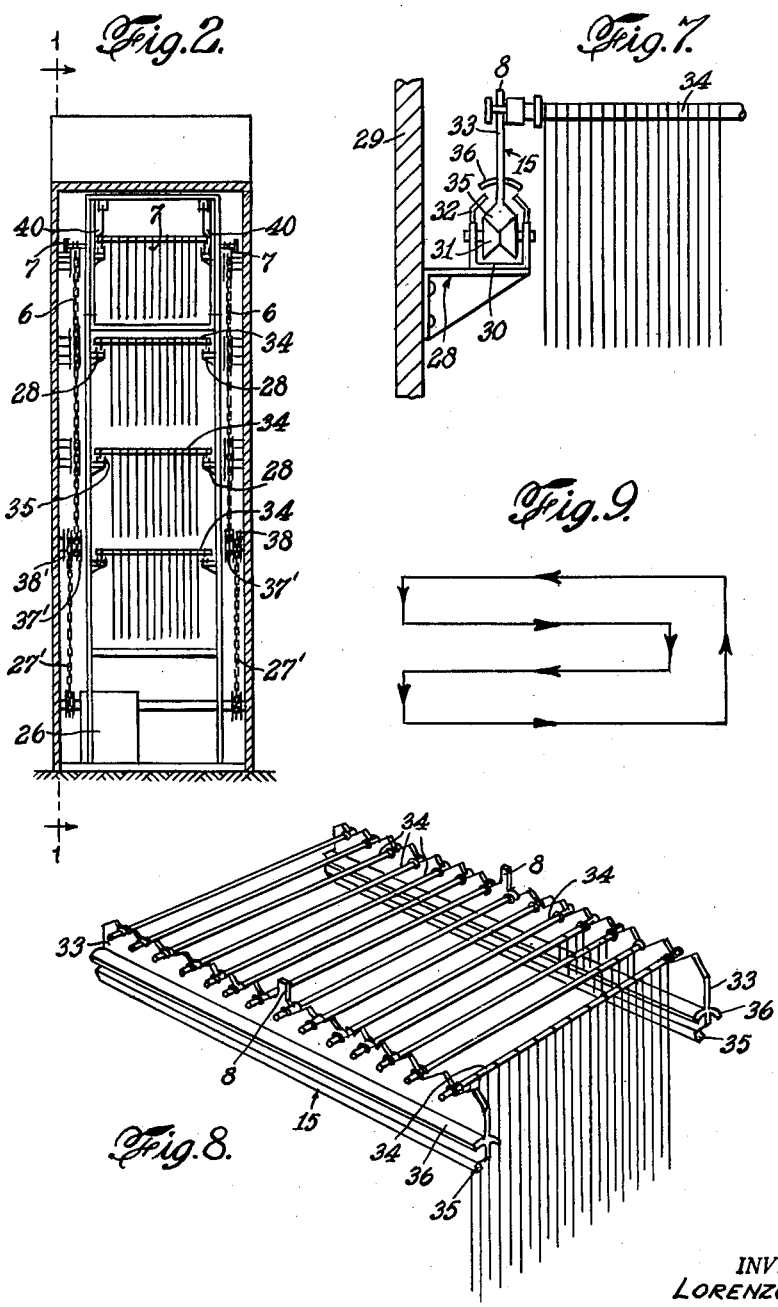

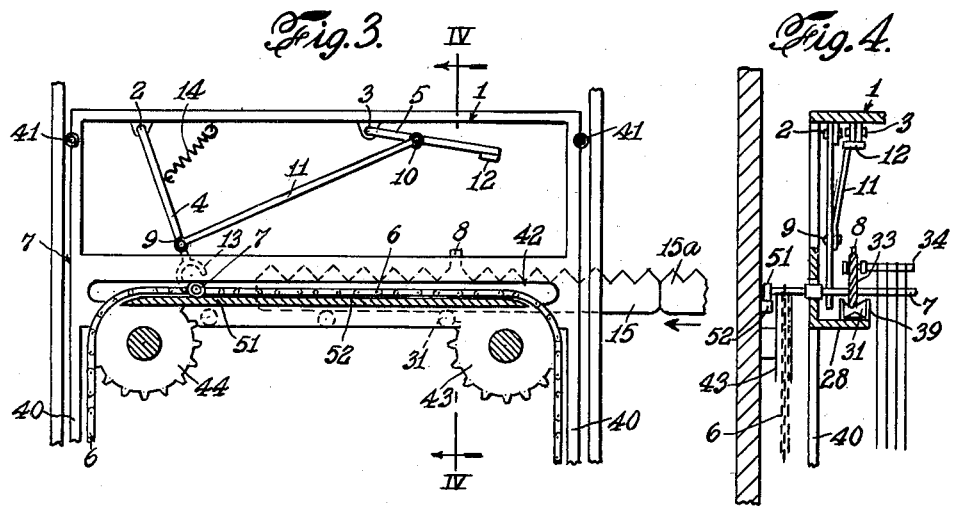
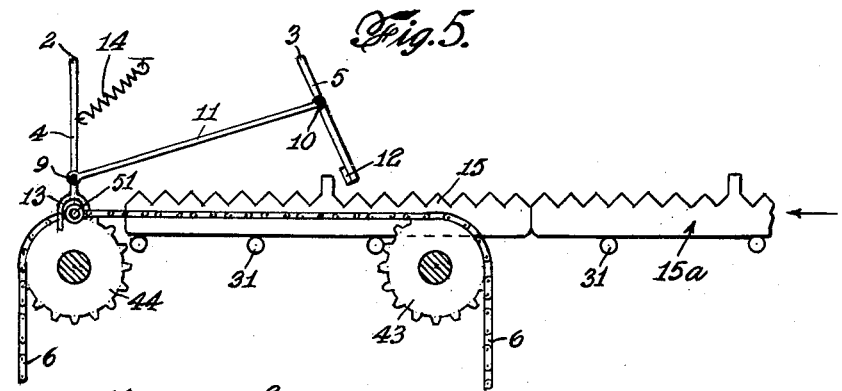
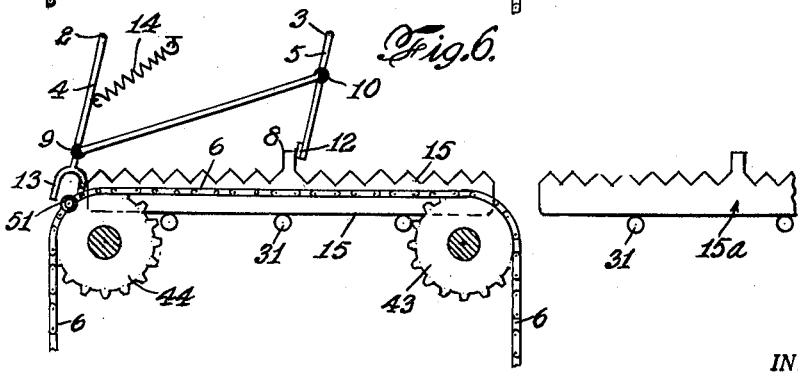

2,631,383

UNITED STATES PATENT OFFICE 2,631,383

AUTOMATIC APPARATUS FOR DRYING ELONGATED DOUGH PRODUCTS AND THE LIKE

Lorenzo Bettini, Rome, Italy

Application October 21, 1948, Serial No. 55,664
In Italy June 18, 1948

5 Claims. (Cl. 34—163)

This invention relates to a continuous apparatus for drying elongated dough products, according to a cycle comprising a progressive recovery and resting period, the term "recovery" being used to designate a rehumidification of the dough, which follows the superficial drying of the dough.

It is an object of this invention to provide an apparatus wherein the dough to be dried travels into the drier housing along a path which is divided in three zones, viz. a zone A, wherein the dough is surrounded by dry hot air flowing from the top to the bottom of the housing; a zone C, wherein the dough is surrounded by air enriched with moisture and flowing from the bottom to the top of the housing; and a zone B, wherein the dough is not exposed to the flow of air, that is to say the dough "rests." This latter phase is intermediate between the two other phases.

It is a further object of the invention to provide an apparatus of the character indicated wherein the dough is moved along a plurality of superposed floors, in each of which the dough passes successively through the said three zones alternately, in the succession A—B—C, and in the succession C—B—A.

Still another object of this invention is to provide means for transferring the dough from one floor to another, comprising two elevators, positioned at the two extremities of the housing outside of the flow of air, so that when the dough is on the elevators, it "rests."

Still another object of this invention is to provide a drier wherein the motion of the dough carriers along the horizontal floors is controlled by the motion of the elevator.

It is a further object of this invention to provide a drier wherein the transfer of the dough from a horizontal floor to the elevator is controlled by a device which prevents the hanging strings or strips of dough from becoming entangled among themselves or with the metallic frame of the apparatus.

With these and other objects in view, as will appear from the following description and drawings, the invention consists in the novel features of construction, combination of elements and arrangement of parts hereinafter to be fully described and pointed out in the appended claims.

An illustrative embodiment of this invention is shown in the accompanying drawings, in which:

Fig. 1 is a side elevation of the drier apparatus, with a wall cut-off, along the line I—I of Fig. 2;

Fig. 2 shows a front view of the apparatus, with a wall cut-off, along the line II—II of Fig. 1;

Fig. 3 is a side view of an elevator;

Fig. 4 is a view of the elevator in section taken on line IV—IV of Fig. 3;

Fig. 5 illustrates schematically one position of the pusher for the dough carriers;

Fig. 6 is a similar view of the pusher in another position;

Fig. 7 shows a detail of the guiding rails of a carrier;

Fig. 8 is a perspective view of a carrier;

Fig. 9 illustrates schematically the path of a carrier during the operative cycle.

With reference now to the figures, the apparatus comprises a closed housing 16 at the two ends of which are positioned two elevators 17 and 17'.

In the drawing, the portions of the apparatus shown at the left are indicated by whole numbers and corresponding portions of the apparatus at the right have been indicated by the same reference numerals to which a (') has been added.

In the central upper portion of the housing 16 there is provided a fan 18 opposite which are positioned the pipes 19 of a radiator. The air sucked from the outside through the opening 20 follows interiorly the housing the path indicated by the arrows 22 and leaves the housing through the opening 21.

Inside housing 16 there are arranged two screens 23 and 24, respectively, in the upper and lower part of the housing beneath the fan 18. These screens define in the central part of the housing a zone wherein no air flows.

There are, therefore, formed inside the housing three zones A, B, C, through which the dough carriers successively pass during their horizontal motion along superposed horizontal floors.

The drying of the dough takes place in different phases. The dough which is in the upper part of zone A will quickly dry out over its external surface by yielding its humidity to the air, which, as it moves downwardly in engagement with the dough on the lower floors will produce a progressively decreasing drying action so that when the air passes into the zone C of the apparatus, it will be so rich with humidity that instead of effecting a drying of the dough, the air will rather moisten the outer surface of the dough, softening the same.

This moistening action with the attendant softening of the dough, is termed "recovery."

The dough which was the first to be surrounded by the hot air in zone A becomes dried externally, whereas its inner portion will contain a rather high quantity of humidity.

During the passage of the dough through zone B, it is no longer exposed to the action of the hot air so that the humidity which has remained in the inner portion of the dough will gradually shift toward the surface.

When the dough is surrounded by the flow of air enriched with moisture, in zone C, it softens again externally, allowing the inner humidity which has shifted toward the surface, to be eliminated when the dough again becomes enveloped by the dry hot air flow.

It has been found in practice that the dough proves to be perfectly dry in a uniform way throughout its bulk. In this way there is avoided the danger of swelling and moldiness.

On the bottom of the housing is positioned an electric motor 25, which controls by means of appropriate transmissions, the set of speed reducing gears 26, which drive through the medium of chains 27 and 27' and 6 and 6' the elevators 17 and 17'. There are two chains 27', one in the fore part of the apparatus and the other (not shown) in the rear of the apparatus.

The housing is provided with a plurality of brackets 28 (Fig. 7) supported by columns 29. The brackets 28 hold U-shaped guides 30 which are as long as the central portion of the apparatus, and therein are fitted the double conical rollers 31 on which the dough carriers slide. On the guide 30 a protective member 32 prevents both dust and sweepings from accumulating either within guide 30 or on the rollers 31.

Each carrier 15 (Fig. 8) comprises two vertical plates which are provided along their upper edges with notches in which the rods 34 carrying the dough strips to be dried rest. Each plate terminates at its lower end in a member of rhomboidal section 35 like that of double cone 31. Above member 35 there is fixed on plate 33 a small metallic protective member 36, which, cooperating with the protective member 32 above mentioned, closes the passage to guide 30. In the middle of each plate 33 upon the central tooth is fitted a projection 8, the purpose of which will be referred to hereinbelow.

The guides 30 provide the series of superposed floors upon which the carriers 15 rest, the dough hanging from the rods 34 as previously mentioned. Thus the dough strips, disposed side by side over the rods 34, subdivide the interior of the housing, into vertical sections wherein the air flows. Owing to the fact that the strips of dough are disposed close to each other, on the rods 34, the air is permitted to circulate in the horizontal sense only along the lower part of the apparatus underneath the screen 24 and the lowermost rows of dough.

Wheels 37 and 37' transmit the motion through wheels 38 and 38' to chains 6 and 6' which operate the goods elevators 17 and 17' which are symmetrically disposed and operate in a similar way.

The elevator 17 (Figs. 3 and 4) comprises a framework 40 provided internally and along both sides with U-shaped guide 39 adapted to face the guide 30.

The sides of frame 40 of elevator 17 are provided with rollers 41 to ensure satisfactory vertical sliding of the elevator inside the framing of the apparatus, and have a horizontal slot 42 in which slides rod 7 which connects the forward and rear chains 6 and is moved by them.

On each end of rod 7 is provided a roller 51 which rests on a guide 52 supported by the framing of the housing in the horizontal portion of chains 6 flush with the floors. Rollers 51 facilitate the sliding of rod 7 on the guide 52. Rod 7, while cooperating with chains 6 in supporting the elevator during its horizontal displacement along slot 42 of the elevator, pushes forward the two plates which form the dough carrier, until these plates are received by the guides 30 after they have left guides 39. At the end of its horizontal displacement, rod 7 is brought downward by chains 6 which pass over the wheels 44.

In Fig. 1 a drier is illustrated having a plurality of dough carriers disposed on the guides 30 of the several floors of the housing. It is supposed that a carrier lies on the elevator 17' still flush with the upper or fourth floor. The elevator 17 is also flush with the upper floor but is unloaded.

The chains 27 and 27' actuate, through the wheels 37 and 38 and 37' and 38', the chains 6 and 6' which displace the rod 7 along slot 42 outwardly and rod 7' in slot 42' inwardly.

In order to impart to the chains 6 and 6' the necessary tension, tensioning rollers 50 and 50' are provided (Fig. 1).

The rod 7' pushes forward the carrier which lies on the elevator 17' and causes the same to pass from guides 39 to guides 30. The carrier, in its turn, pushes forward the dough carriers which lie on guides 30, so as to compel the last left hand (Fig. 1) carrier to enter the elevator 17.

The upper wall 1 of the elevator 17 supports crank levers 4 and 5, pivoted at 2 and 3 and connected to each other by means of coupling rod 11, pivoted at 9 on lever 4 and at 10 on lever 5. Levers 4 and 5 are not coplanar but move in parallel planes. Lever 4 is located in a plane external to plane 33 (Fig. 4) of the carrier 15, having its pivoting point 2 in the vertical plane passing through the center of wheel 44, whereas lever 5 is in the same plane as plate 33. The distance between pivots 2 and 9 is greater than the distance between pivots 3 and 10 and the said distances are so proportioned that the linear speed of the head 12 applied to lever 5 is higher than that of the fork 13 applied to the end of lever 4. The assembly of the two levers 4 and 5 is kept in idle position by spring 14.

Rod 7, which is ahead of the dough carrier which is being loaded on elevator 17 (Fig. 3) moves forwardly under the action of chains 6. It engages the fork 13 and, opposing the resistance of spring 14, moves the assembly of levers 4 and 5 causing head 12 to go forward. Head 12 in passing over the carrier 15 strikes against projection 8 of the plate of the carrier lying on the elevator 17 thereby causing the carrier to separate from the adjacent carrier 15a which remains on guide 30 (Fig. 6).

Chains 6 and 6', continuing in their motion displace downwardly, by means of rods 7 and 7', the elevators 17 and 17', the first carrying a dough carrier while the second is unloaded. When the upper surface of elevator 17 is at the level of wheels 45 and 46, at the next lower or third floor, the rod 7, moving now inwardly, pushes onto the guides 30 of this floor the dough carrier lying on the elevator 17 and this carrier pushes forward the dough carriers which lie on the guides 30 of the third floor, causing the last right hand (with respect to Fig. 1) carrier to enter the elevator 17' in the same manner as above described. The upper portion of the elevator 17' is provided with an assembly of levers like that described for the elevator 17, but this assembly of levers operates in the opposite direction.

Successively, the elevators are brought down to the next two lower floors and are then lifted again to the top floor.

The arrangement of the chains on the wheels 43, 44, 45, 46, 47, 48, 49 and 37 is carried out in such manner that the displacement of the elevator from the top floor to the bottom or first floor takes place with stops at the different floors, while the displacement in the opposite direction takes place without stopping at the different floors. Each carrier therefore follows the path schematically indicated in Fig. 9.

The housing 16 is provided at its left hand end and at its right hand end (as seen in Fig. 1) with walls having doors, not shown in the drawings, for introducing and removing the carriers and for the inspection and maintenance of the apparatus.

As shown in Fig. 1, the carriages on the upper or fourth floor of the apparatus move from right to left, from left to right in the next subjacent or third floor, from right to left in the next subjacent or second floor and from left to right in the bottom or first floor. The elevator at the left lowers one carriage at a time from the top floor to the third floor and from the second floor to the bottom or first floor. The elevator on the right lowers one carriage from the third floor to the second floor and then raises one carriage from the bottom or first floor to the top or fourth floor. The pushers operate in connection with the loading of a carriage on to an elevator. The rods 7, 7', carried on the chains which drive the elevators, serve to push the carriage off the elevator. Thus, when the elevators are in the position shown in Fig. 1, the rod 7' on the chain which drives the right-hand elevator, moves toward the left and pushes the carriage in the right-hand elevator toward the left. This, of course, pushes the carriages ahead and tends to push the end carriage on to the left-hand elevator. This motion is, however, not sufficient to push the end carriage entirely on the left-hand elevator so that the pushers take over and complete the loading operation. As shown in Figs. 3, 4, 5 and 6, the rod 7 on the chain which operates the left-hand elevator, engages the fork 13 of the associated pusher and moves it toward the left. This causes the lever 5, which carries the head 12, also to be moved to the left and as it so moves it engages the projection 8 on the carriage and moves the carriage along with it to the left into fully loaded position on the elevator. Thus, the pusher on the left-hand elevator operates to move the carriages to the left when loading the elevator and the pusher on the right-hand elevator operates to move the carriages to the right to load them on the right-hand elevator at the third floor and at the bottom or first floor in the apparatus.

The elevators themselves are also operated by the rods 7 and 7' which are carried by the continuously moving chains 6 and 6'. As shown in Fig. 3, the elevator has a side wall with a slot 42 in which the rod 7 rides, the elevators being guided for vertical movement by rollers 41 in the vertical housing frame. As the rod 7 reaches the left-hand end of the slot 42, it starts downwardly with the chain 6 and in so doing pulls the elevator downward with it. Referring now to Fig. 1, when the elevator is moved downwardly to a position opposite the third floor, the chain 6 passes around pulley 45 and runs horizontally. This causes the rod 7 also to move horizontally in the slot 42 and, as previously mentioned, to push the carriage out of the elevator. When the rod 7 then reaches the right-hand end of the slot 42, it starts downwardly again by reason of the movement of the chain 6 over pulley 46 and pulls the elevator downwardly with it until the elevator is opposite the second floor. The rod 7 then follows a horizontal movement again as the chain 6 passes over pulley 47. During this period, the right-hand elevator is also opposite the second floor, since the chains 6 and 6' are operated in unison, and the rod 7' on the chain 6' pushes a carriage out of the right-hand elevator onto the left-hand elevator and the pusher of the left-hand elevator completes the loading operation. The rod 7 then reaches the left-hand end of the slot 42 and as it moves downwardly, pulls the elevator downwardly to a position opposite the first or bottom floor. At the same time, the rod 7' reaches the left-hand end of the slot 42' in the right-hand elevator and moves this elevator downwardly to a position opposite the lowermost floor. The rods 7 and 7' then move horizontally to the right and then, carried by chains 6 and 6', move upwardly to their uppermost position, carrying with them the two elevators to a position opposite the fourth or uppermost floor, and the cycle is repeated.

I claim:

1. An automatic apparatus for the drying of elongated dough products and the like comprising, in combination, a closed housing, a fan centrally located at the top of the housing and arranged to produce a current of air in said housing, heating means for the air positioned in the air path near said fan, two horizontal dividing elements situated respectively in the lower and in the upper part of the housing below said fan adapted to define inside the housing a central zone, wherein vertical circulation of air is prevented by said dividing elements, and two lateral zones permitting free vertical circulation, passageways for air being provided between said lateral zones above and below said dividing elements, horizontal spaced pairs of parallel guides inside said housing, defining a plurality of superposed floors, carriers for the suspended dough strips supported for sliding movement by said guides, means located at each end of said housing for lowering one at a time the said carriers from an upper to a next lower floor in series and for raising the said carriers one at a time from the lowest to the highest level, and means operated by said raising and lowering means for pushing the carriers alternately in opposite directions on the guides.

2. An apparatus according to claim 1, wherein each of said carriers is formed with two lateral plates resting on the guides of the housing, and having on their upper side a plurality of adjacent notches, a plurality of rods movably introduced in said notches connecting in the upper part said lateral plates arranged to support a plurality of dough strips suspended on the said rods in a closed position so as to permit the flow of air from said fan only in the vertical direction and to prevent the flow of said air in horizontal directions.

3. An apparatus according to claim 1, comprising a lateral chamber at each end of the housing, an elevator in each of said chambers, a pair of guides in each elevator adapted to support a carrier, two pairs of chains for the vertical displacement of the said elevators, a rod transversally connecting the chains of each pair of chains adapted to support the elevator and to horizontally push the carrier supported by the elevator out of said elevator on one of the floors when the elevator is still at that floor and the guides of the elevtor are aligned with the guides of said floor.

4. An apparatus according to claim 3, wherein the two pairs of chains for the vertical displacement of the elevators are adapted to travel two horizontal paths respectively at both the lowest and highest floor, a vertical continuous path from the lowest to the highest floor, and a vertical path from the highest to the lowest floor and two horizontal paths at the intermediate floors.

5. An apparatus according to claim 1, comprising a device arranged at the top of the elevator and operated by the carrier leaving the housing and entering the elevator, said device being adapted to strike the carrier entering the elevator and to separate it from the adjacent carrier left inside the housing.

BETTINI, LORENZO.

REFERENCES CITED

The following references are of record in the file of this patent:

UNITED STATES PATENTS

| Number | Name | Date |
|---|---|---|
| 181,987 | Seymour | Sept. 5, 1876 |
| 1,577,589 | Rapp | Mar. 23, 1926 |
| 1,646,259 | Roberts | Oct. 18, 1927 |
| 1,689,099 | Applegate | Oct. 23, 1928 |
| 1,881,063 | Randolph | Oct. 4, 1932 |
| 1,980,163 | Belcher | Nov. 13, 1934 |
| 2,152,312 | Jennings et al. | Mar. 28, 1939 |
| 2,515,684 | Ambrette | July 18, 1950 |

FOREIGN PATENTS

| Number | Country | Date |
|---|---|---|
| 271,666 | Germany | Mar. 16, 1914 |